(12) United States Patent
Algesheimer et al.

(10) Patent No.: US 7,844,496 B2
(45) Date of Patent: Nov. 30, 2010

(54) METHOD AND SYSTEM FOR PROCESSING A REQUEST OF A CUSTOMER (75) Inventors: Joy Algesheimer, Zurich (CH); Christian Cachin, Thalwil (CH); Jan Camenisch, Rueschlikon (CH); Guenter Karjoth, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 2012 days.

(21) Appl. No.: 10/429,365

(22) Filed: May 5, 2003

(65) Prior Publication Data
US 2004/0225570 A1 Nov. 11, 2004

(51) Int. Cl.
*G06Q 30/00* (2006.01)
(52) U.S. Cl. .......................................... 705/26; 705/27
(58) Field of Classification Search ................... 705/26, 705/27
See application file for complete search history.

(56) References Cited

U.S. PATENT DOCUMENTS

| 6,026,374 | A | | 2/2000 | Chess | |
|---|---|---|---|---|---|
| 6,070,185 | A | * | 5/2000 | Anupam et al. | 709/204 |
| 2004/0148500 | A1 | * | 7/2004 | Olkin et al. | 713/150 |

OTHER PUBLICATIONS

Protecting Mobile Agents Against Malicious Hosts, Tomas Sander and Christian F. ITschudin; Feb. 1998, to appear in G. Vigna(ed.), Mobile Agent Security, LNCS xxx: Internation Computer Science Institute, 1947 Center Street, Berkley CA 94704.
Non-Interactive CryptoComputing for NC[1:] Tomas Sander, Adam Young and Moti Yung.
One-Round Secure Computation and Secure Autonomous Mobile Agents (Extended Abstract): Christian Cachin, Jan Camenisch, Joe Kilian and Joy Muller. IBM Zurich Research Lab, CH-8803 Ruschlikon, Switzerland and NEC Research Institute Princeton, NJ 08540.

(Continued)

*Primary Examiner*—Jeffrey A. Smith
*Assistant Examiner*—Michael A. Misiaszek
(74) *Attorney, Agent, or Firm*—Ido Tuchman; Kenneth R. Corsello (57) ABSTRACT

The invention provides methods, apparatus and systems for securely processing an originator request of a customer. This originator request can be sent to at least one first entity. An example of a method for processing the originator request comprises the steps of a) sending from the customer the originator request to each first entity; b) connecting each first entity to a computation entity; c) each first entity, adding, on receipt of the originator request, information concerning the originator request thereby forming a first-modified request; d) sending at least part of the first-modified request to at least the computation entity; e) the computation entity having received at least part of the first-modified request deriving a computation-entity result from the at least part of the first-modified request; f) sending at least part of the computation-entity result to each first entity; g) each first entity having received at least part of the computation-entity result deriving therefrom a first-entity result and forwarding it at least in part; and h) the customer having received at least part of the first-entity result, deriving therefrom a customer result.

15 Claims, 3 Drawing Sheets

OTHER PUBLICATIONS

How to Generate and Exchange Secrets (extended abstract): Andrew Chi-Chih Yao, Dept. of Computer Science Princeton University, Princeton NJ 08544, 1986 IEEE.

A Randomized Protocol for Signing Contracts, Shimon Even, Oded Goldreich and Abraham Lampel: Jun. 1985, vol. 28, No. 6, Communications of the ACM.

Information Theoretic Reductions Among Disclosure Problems(extended Abstract): Gilles Brassard, Claude Crepeau and Jean-Marc Robert.

How to Construct Random functions: Oded Goldreich, Shafi Goldwasser and Silvio Micali: Massachusetts Institute of Technology, Cambridge, Massachusetts. Journal of the Association for Computing Machinery, vol. 33, No. 4, Oct. 1986, pp. 792-807.

Non-Malleable Cryptography, Danny Dolev, Cynthia Dwork, and Moni Naor. Dec. 30, 1998.

Random Oracles are Practical: A Paradigm for Designing Efficient Protocols: Mihir Bellare and Phillip Rogaway. 1st Conf.-Computer &Commun. Security '93—Nov. 1993—VA, USA . 1993 ACM.

Number-Theoretic Construction of Efficient Pseudo-Random Functions(extended Abstract). Moni Naor and Omer Reingold. 1997 IEEE pp. 458-467.

Privacy Preserving Auction and Mechanism Design. Moni Naor, Benny Pinicas and Reuben Sumner. 1999 ACM.

Wilhelm et al., A Pessimistic Approach to Trust in Mobile Agent Platforms., http://csdl2.computer.org/persagen/DLAbsToc.jsp?resourcePath=/dl/mags/ic/&toc=comp/mags/ic/2000/05/w5toc.xml&DOI=10.1109/4236.877485, pp. 1-2 (Jan. 6, 2008).

Introducing Trusted Third Parties to the Mobile Agent Paradigm (1999), http://citeseer.ist.psu.edu/wilhelm99introducing.html, pp. 1-2 (Jan. 6, 2008).

Sandholm et al., Nomad: Mobile Agent System for an Internet-Based Auction House, IEEE Internet Computing, http://www.agent.ai/doc/upload/200302/sand00_3.pdf, pp. 1-7 (Apr. 2000).

European Patent Office Action for Application No. 01 978 722.5-2201 (Feb. 26, 2007).

* cited by examiner

METHOD AND SYSTEM FOR PROCESSING A REQUEST OF A CUSTOMER

TECHNICAL FIELD

The present invention relates to secure processing of a customer request. More particularly, the invention relates to cryptographic security of mobile agents.

BACKGROUND OF THE INVENTION

In the increasingly networked world, mobile code is a programming paradigm that becomes more and more important. It provides a flexible way to structure cooperative computation in distributed systems. At present, the Internet is full of mobile code fragments, such as Java applets, which represent only a simple form of mobile code.

Mobile agents are mobile code that act autonomously on behalf of a user for continuous collecting, filtering, and processing of information. They combine the benefits of the agent paradigm, such as reacting to a changing environment and autonomous operation, with the features of remote code execution. They operate in computer networks and are capable of moving from server to server as necessary to fulfill their goals. Important applications include mobile computing, where bandwidth is limited, or users are disconnected, data retrieval from large repositories, and configuration management of software and networks. The vision of mobile agents roaming the Internet may soon become reality as the paradigm is incorporated in large-scale applications.

Mobile code is to be understood as a program that is produced by one entity, called the originator, and is subsequently transferred to another entity, the host, immediately before it is executed by the host. In other words, no manual intervention, such as performing an installation or running a setup routine, is required on behalf of the host; mobile code comes ready to run. Moreover, mobile agents are capable of continued, autonomous operation disconnected from the originator and migrate freely to other hosts during their lifetime. Such agents have also been called itinerant agents. Mobile code is exposed to various security threats: a malicious host may examine the code, try to learn the secrets carried by an agent, and exploit this knowledge in its interaction with the agent to gain an unfair advantage. A host might also try to manipulate the result of a computation.

There are at least two security problems that arise in the area of mobile code: (1) protecting the host from malicious code and (2) protecting the code from malicious hosts. The first problem has received considerable attention because of the imminent threat of computer viruses and Trojan horses. Current solutions are to run mobile code in a so-called sandbox with fine-grained access control and to apply code signing for exploiting a trust relation with the code producer.

Protecting mobile code was deemed impossible by some mobile code researchers until T. Sander and C. F. Tschudin realized that tools from theoretical cryptography could be useful to execute mobile code in an encrypted form on an untrusted host, as described in their article "Protecting mobile agents against malicious hosts, Mobile Agents and Security" (G. Vigna, ed.), Lecture Notes in Computer Science, vol. 1419, Springer, 1998. Most protocols for so-called secure computation require several rounds of interaction, however, and are not applicable to achieve secrecy for mobile applications and integrity for their outputs. Sander and Tschudin concluded that only functions representable as polynomials can be computed securely in this manner. Subsequent work of Sander et al. extends this to all functions computable by circuits of logarithmic depth, as disclosed by T. Sander, A. Young, and M. Yung in "Non-interactive CryptoComputing for $NC^1$", Proc. 40th IEEE Symposium on Foundations of Computer Science (FOCS), 1999.

A further form of code is active mobile code that performs some immediate action on the host. Thereby, information about the encrypted computation is often leaked to the host whereby only the originator shall receive any output.

A basic problem with active mobile code is that a malicious host can observe the output of the computation and simply run the code again with a different input. The only known existing defense for active mobile code against a malicious host uses trusted hardware. This has been proposed and entails running mobile code exclusively inside tamperproof hardware, encrypting it as soon as it leaves the trusted environment.

U.S. Pat. No. 6,026,374 is related to a system and method using of a trusted third party to provide a description of an information product to potential buyers, without disclosing the entire contents of the information products, which might compromise the interests of the seller. The buyer trusts the third party to give an accurate description of the information that is for sale, while the seller trusts the third party not to reveal an excessive amount of the information product's content. The system can include a seller of information products, a buyer of such products, and a trusted third party summarizer. Each of these operating as a node in a communications network, such as the Internet. A disadvantage of this system and method is that the third party has to be a trusted one and that this third party gets information and learns about everything. This could be dangerous if said third party gets cracked. Moreover, several messages are necessary to process the request of the buyer.

SUMMARY AND ADVANTAGES OF THE INVENTION

The invention provides methods, apparatus and systems for securely processing an originator request of a customer, i.e. the request being initiated by the customer. This originator request is sent within a mobile code or agent to at least one first entity. An example method for processing the originator request comprises the steps of a) sending from the customer, i.e. from the customer's device, the originator request or each first entity; b) connecting each first entity to a computation entity; c) each first entity adding, on receipt of the originator request, information concerning the originator request thereby forming a first-modified request; d) sending at least part of the first-modified request to at least the computation entity; e) having received at least part of the first-modified request by the computation entity deriving a computation-entity result from the at least part of the first-modified request; f) sending at least part of the computation-entity result to each first entity; g) having received at least part of the computation-entity result by each first entity deriving therefrom a first-entity result and forwarding it at least in part; and h) having received at least part of the first-entity result by the customer deriving therefrom a customer result.

In an advantageous embodiment, that only the customer learns the result of the calculation, whereby other entities or hosts learn nothing at all except for results which are designated to them. The mobile code or agent comprising the originator request is sent around a network to several entities whereby the code or at least fragments thereof can be securely executed without any additional client hardware at the first entity. Security is obtained through the computation entity that is a generic independent entity. This independent entity can be a computation service that performs an encrypted computation on behalf of the mobile agent, but does not learn anything about the encrypted computation. The independent entity can serve many different applications whereby nothing about its usage is necessary to know before deploying it. Privacy as well as authenticity for the mobile agents can be achieved. Moreover, the computation service itself does not learn anything about the computation, assumed it does not collude with the code originator CO or the first entity.

In same embodiments: the independent entity is universal rather than bound to a particular service or to an application context. For example, secure computation servers can be set up and operated by independent entities.

A method and system of this invention may be based on software and commodity hardware and therefore may be less expensive to build and operate than any solution involving specialized hardware.

A cryptographic operation can be applied to the mobile agent comprising the request or a result. Thus, integrity for the mobile agent can be advantageously guaranteed.

When the originator request is formed by applying an encrypted circuit construction, then the advantage occurs that a secure computation of the request can be achieved and the originator of that request can define how much information an entity shall receive.

The originator request may comprise a function in encrypted form. This is advantageous, because then other entities processing the originator request can not derive useful information therefrom except results which are designated to those entities.

The originator request, the first-modified request, the computation-entity result, and the first-entity result may comprise an encrypted part. This is advantageous, because then sensitive information is protected and is not readable as plain text.

The originator request may comprise an offer or any other legal instrument. It may also comprises purchase information or customer information, such as the address for delivering or the credit card number for financial transactions.

The first entity comprises a web server offering a service or goods. This service can merely be everything including sale, lease, license, or financing transaction.

The first-entity result may comprise a customer information concerning acceptance of the originator request. This is advantageous, because then the first-entity can deliver its service or goods immediately and initiate the necessary transactions.

The customer result may comprise the first-entity information concerning acceptance of the originator request. The customer therefore knows that its originator request will be fulfilled and no further actions are necessary.

DESCRIPTION OF THE DRAWINGS

Preferred embodiments of the invention are described in detail below, by way of example only, with reference to the following schematic drawings.

The drawings are provided for illustrative purpose only and do not necessarily represent practical examples of the present invention to scale.

DESCRIPTION OF THE INVENTION

With general reference to the figures the features of a method and system for processing a request of a customer using cryptographic functions is described in more detail below. When referring to the word customer, it appears obvious that a device, such as a computer or mobile appliance, used by the customer is meant.

A defining element of a mobile code or agent computation is that it proceeds autonomously and independently of the originator of the code. The secure mobile agent computation is modeled in principle as depicted in FIG. 1, whereby the boxes are labeled according to the description below.

There are a code originator CO, and l hosts, hereinafter referred to as entities $H_1, \ldots, H_l$, on which the mobile agent, hereinafter short agent, runs.

Figure 1:
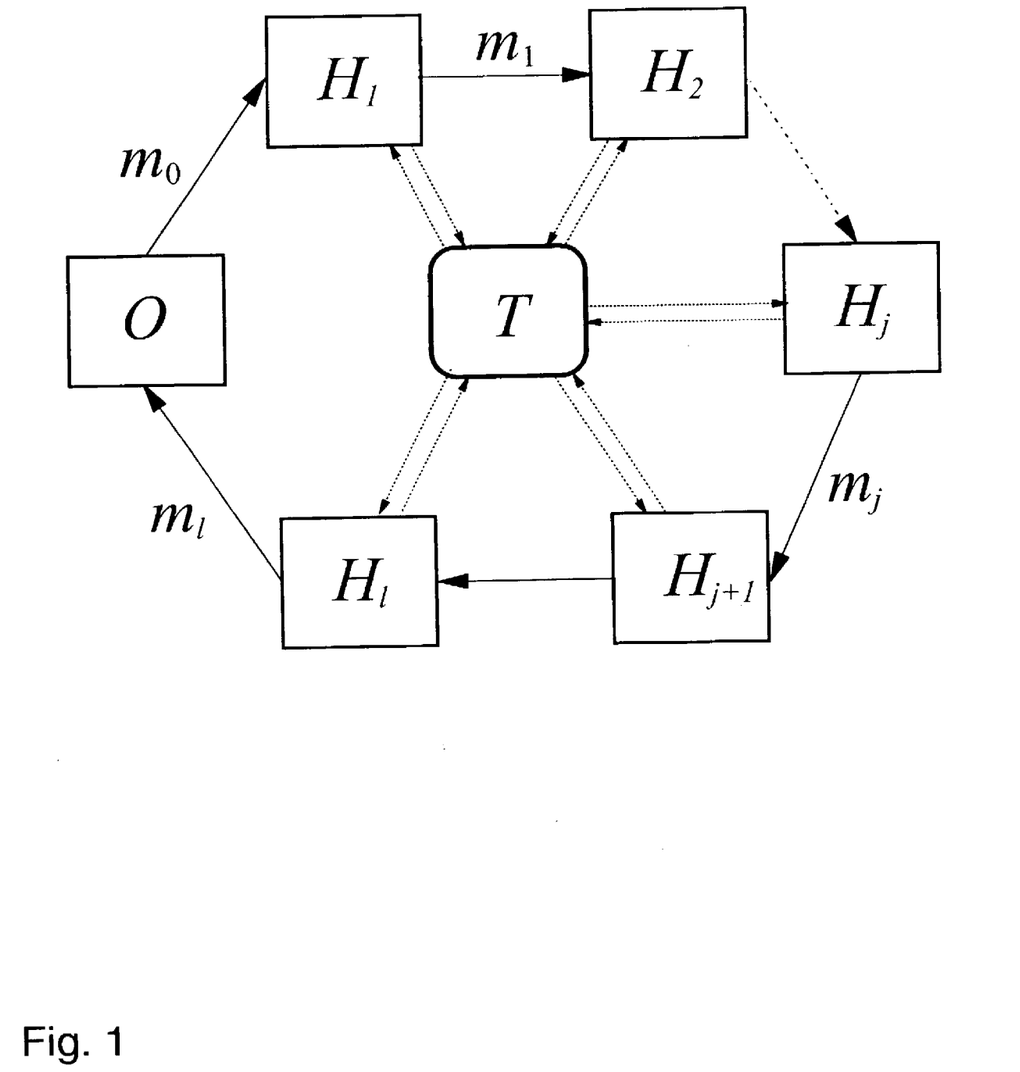
FIG. 1 shows an illustration of a communication flow according to the present invention.

FIG. 1 shows a network, such as the Internet, whereby the code originator CO is connected to a first entity $H_1$, that is further connected to a second entity $H_2$. The second entity $H_2$ is connected to an entity labeled with $H_j$ that further has a connection to an entity labeled with $H_{j+1}$, whereby several other entities are possible in-between as indicated by the dotted line. The entity $H_{j+1}$ is connected to an entity labeled with $H_l$ that in the following is connected back to the code originator CO. Each of the entities $H_1, H_2, \ldots, H_j, H_{j+1}, H_l$ is connected to a computing entity T.

The code originator CO as well as each entity $H_1, H_2, \ldots, H_j, H_{j+1}, H_l$ sends and receives only a single message, that comprises the agent. The message that the code originator CO sends to the first entity $H_l$ is denoted by $m_o$ and the message that a further entity $H_j$ sends to $H_{j+1}$ by $m_j$ for $j=1, \ldots, l-1$, and the message that the last entity $H_l$ returns to the code originator CO is denoted by $m_l$.

Figure 2:
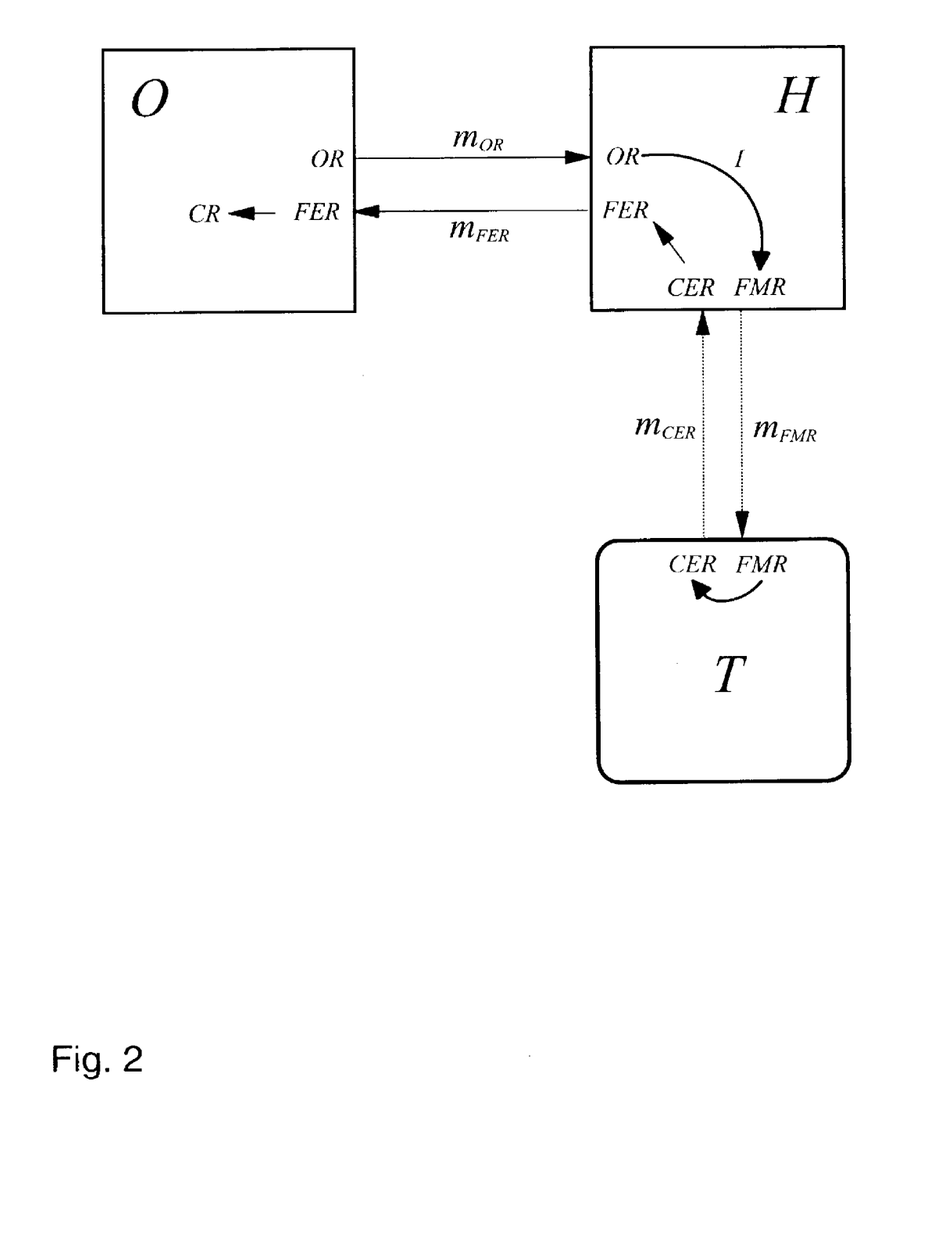
FIG. 2 shows a more detailed illustration of a communication flow.

FIG. 2 depicts a more detailed illustration of the communication flow as shown in FIG. 1. The code originator CO, that here is a customer CUS, is connected to the first entity, here labeled with H, that further is connected to the computing entity T. The method for processing an originator request OR, e.g. a price request including a threshold for a product, of the customer CUS runs as follows. The customer CUS sends the originator request OR to the first entity H. This is indicated by the arrow labeled with $m_{OR}$. The first entity H offers several products to a particular price. The first entity H connects to the computation entity T and adds, on receipt of the originator request OR, information I concerning the originator request OR, e.g. a price it is willing to accept, thereby forming a first-modified request FMR. This first-modified request FMR is sent to the computation entity T as indicated by the arrow labeled with $m_{FMR}$. If the computation entity T has received the first-modified request FMR it derives therefrom a computation-entity result CER without learning anything from this computation. Afterwards, the computation-entity result CER is sent back to the first entity H as indicated by the arrow labeled with $m_{CER}$. If the first entity H has received the computation-entity result CER it derives therefrom a first-entity result FER and forwards this back to the customer CUS as indicated by the arrow labeled with $m_{FER}$. The customer CUS is able to derive from the first-entity result FER a customer result CR. This customer result CR provides the information to the customer CUS whether or not his originator request OR has been fulfilled. The first entity H knows form the first-entity result FER whether or not its offer is acceptable to the customer CUS. The originator request OR may contain information about the customer CUS, i.e. address, credit card information, which allows the first entity H to deliver the requested product immediately.

In the embodiment described above, the mobile agent visits several vendor sites and compares offers. The originator request OR does not only be based on price, but can also include other attributes. The originator or customer CUS wants to maintain the privacy of his preferences, but a shop has an interest to learn the buyer's strategy as well as information about other vendor's offers. For complex offers where the price is determined individually for each customer based on its needs, such as in the insurance market, the vendor wants to keep its method of calculating the price secret. All these requirements can be fulfilled by the described scheme for secure mobile code.

In another embodiment, a shopping agents is traveling around the network and collects offers from several vendors or entities $H_1, H_2, \ldots, H_j, H_{j+1}, H_l$, whereby a prior agreement on the data format of the offers is helpful.

Figure 3:
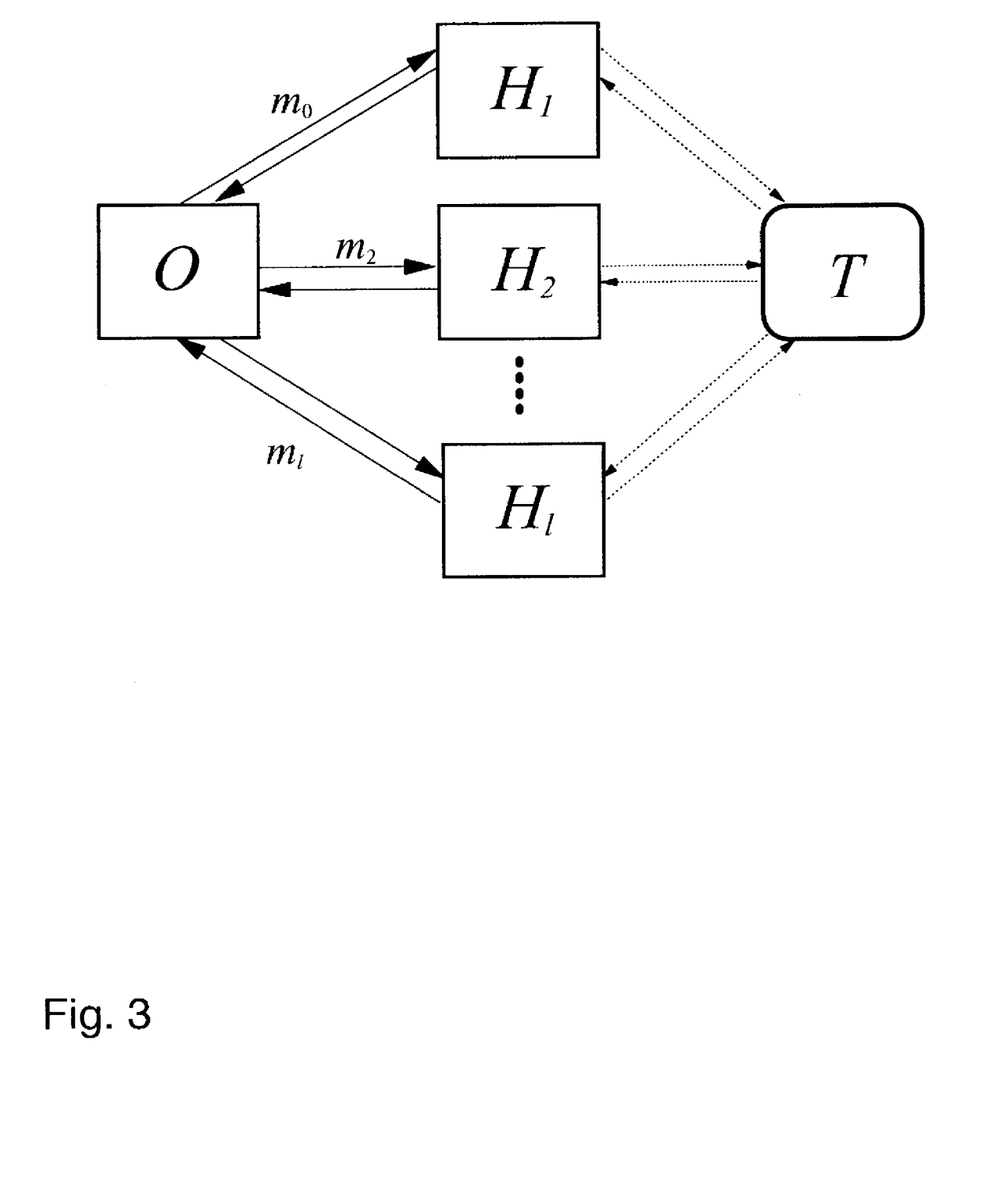
FIG. 3 shows another illustration of a communication flow.

FIG. 3 shows another embodiment using the same or similar parts as shown in FIGS. 1 and 2. The difference is the code originator CO sends directly to each entity $H_1, H_2, \ldots, H_l$ its originator request OR, whereby the originator request OR can be the same or different to each entity $H_1, H_2, \ldots, H_l$.

In a further embodiment an electronic negotiation is described. The electronic negotiation between a buyer and a single vendor can take place using the scheme for secure mobile code that visits a single host or entity H. Typically, the vendor would act as the originator CO and download an applet to the buyer's browser (as is already quite common on the Internet). The applet is executed using the help of the computation entity T by the buyer and the offer is displayed to the buyer. The vendor may obtain some information as well, which it would spell out clearly in a "privacy statement" accompanying the applet.

Auctions with generalized bidding strategies present an interesting application area for secure mobile agents. Bidding agents can implement a complex strategy being a function of time and other participants' behavior, which gives the bidder more flexibility compared to traditional single-parameter auctions based purely on price. As the value of the lots is interrelated, a bidder is interested to define his bidding behavior as dynamically as possible, for example making the valuation of a lot depend on other winning bids that he observed in the previous rounds. If the bidders can express their strategies as a computable function, then one may construct a circuit to compute the auction function, i.e., the outcome of the auction, with the strategies as the private inputs of all participants. This would require an auction agent that visits each bidder only once. However, in the likely case that the bidders are unable to express their strategies mathematically, each round of the auction could also be performed securely by an auction applet that visits each bidder once and returns to the auctioneer. There it outputs the winning bids or the end of the auction if the bids did not exceed the minimum increment. If the scheme for secure mobile computing is used, then there is no single entity $H_1, H_2, \ldots, H_j, H_{j+1}, H_l$ that sees all bids (like the auctioneer, its computer system, or its operators). Generalized auctions are common in electricity markets, equities trading, bandwidth auctions, and transportation exchanges, and bidders often have preferences over combination of items.

In the following, implementation details are described.

Computation: Let the state of the mobile agent be an element of a set X. Its initial state $x_o$ is determined by O. Let the input by $H_j$ be an element of a set $Y_j$ and the output to $H_j$ an element of $Z_j$. The agent computation on the entity $H_j$ is represented by two functions $$g_j: X \times Y_j \to X \text{ and } h_j: X \times Y_j \to Z_j$$

that determine the new state $x_j = g_j(x_{j-1}, y_j)$ of the agent and the output $z_j = h_j(x_{j-1}, y_j)$. O obtains the final state $\xi = x_l \in X$ of the agent. The functions $g_j$ and $h_j$ are known to all entities $H_1, \ldots, H_l$.

A mobile computing scheme comprises 2l+2 algorithms $A_o, A_1, \ldots, A_l, B_1, \ldots, B_l$, and D such that for all j=1, ..., l and $x_0 \in X$, $y_j \in Y_j$, and with $$m_0 = A_0(x_0)$$

$$m_j = A_j(m_{j-1}, y_j) \text{ for } j=1, \ldots, l$$

$$z_j = B_j(m_{j-1}, y_j) \text{ for } j=1, \ldots, l$$

$$\xi = D(m_l)$$

the following two conditions Correctness and Privacy hold.

Correctness: $\xi = g_l(x_{l-1}, y_l)$ and $z_j = h_j(x_{j-1}, y_j)$
for j=1, ..., l using $$x_{j'} = g_{j'}(\ldots (g_2(g_1(x_0, y_1), y_2) \ldots), y_{j'}) \text{ for } j'=1, \ldots, l-1.$$

Privacy: The inputs, outputs, and the computations of all entities remain hidden from the originator and from all other entities, except for what follows from their outputs. O learns only $\xi$ but nothing else about any $y_j$ than what follows from $x_0$ and $\xi$, and similarly, $H_j$ learns only $z_j$ but nothing about $x_0$ and $y_{j'}$ for j'<j than what follows from $z_j$ and $y_j$.

For simplicity reasons, the above scheme assumes that the order in which the agent visits all entities is fixed. It is extended to allow for the sequence to depend on $z_j$ by introducing a function $\pi: Z_j \to \{1, \ldots, l\}$ and sending the agent to $H_{\pi(z_j)}$ from $H_j$. In the case of mobile code applications with a single host, i.e. the first entity H only, the function g yields O's output $\xi$ and h gives H's output z.

A computation entity T, that can be a generic secure computation service, is provided. This computation entity T is on-line and connected to all entities $H_1, \ldots, H_l$ or hosts running agent applications and is at their disposal for securing agent computations. The computation entity T itself does not gain any information about the computation, no matter how it behaves, under the assumptions that (1) the computation entity T does not collude with the originator against any entity, and (2) the computation entity T does not collude with any entity against the originator or against any other entity. All computations proceed with minimal or no interaction. The scheme is generic and not bound to any particular application. Hence the service of the computation entity T might be offered as a public service for "secure mobile agent computation" on the Internet. Clients or customers who use this service in the role of O or H (e.g., for comparison shopping) do not have to fear that the computation entity T has "second thoughts" trying to violate their privacy (e.g., of customer profiling and collecting marketing data). Moreover, the computation entity T itself has an interest to maintain its reputation as a security provider.

The scheme is based on functions in encrypted form. For example, encrypting a binary digital circuit realizes the part of the agent computation. This can be realized by an encrypted circuit construction as described in the following.

Encrypted Circuit Construction

The encrypted circuit construction of Yao, as introduced by A. C. Yao in his article "How to generate and exchange secrets" at Proc. 27th IEEE Symposium on Foundations of Computer Science (FOCS), 1986, pp. 162-167, is an interactive protocol for secure function evaluation between two parties or entities. This is described for a binary function g(•,•) and parties Alice (with input x) and Bob (with input y). Bob receives the output z=g(x,y) but learns nothing else and Alice learns nothing at all.

Let $(x_1, \ldots, x_{n_x})$, $(y_1, \ldots, y_{n_y})$, and $(z_1, \ldots, z_{n_z})$ denote the binary representations of x, y, and z, respectively, and let C denote a polynomial-sized binary circuit computing g. The components of Yao's construction are (I) a first algorithm construct that Alice uses to construct an encrypted circuit, (II) a transfer protocol between Alice and Bob, and (III) a second algorithm evaluate allowing Bob to retrieve g(x, y). More precisely, these procedures are as follows.

(I) The probabilistic first algorithm construct(C) takes the circuit as input and outputs the tuple (C, L, K, U), where C may be viewed as an encrypted version of the $n_x + n_y$-input circuit $C(\bullet, \bullet)$ and where L, K, and U denote lists of so called key pairs $L = (L_{1,0}, L_{1,1}), \ldots, (L_{n_x,0}, L_{n_x,1})$ $K = (K_{1,0}, K_{1,1}), \ldots, (K_{n_y,0}, K_{n_y,1})$ $U = (U_{1,0}, U_{1,1}), \ldots, (U_{n_z,0}, U_{n_z,1})$ corresponding to x, y, and z, respectively.

In order to compute C(x, y) from the encryption C, Bob needs one "key" for each input bit: $L_{i,b}$ corresponds to input bit $x_i = b$ and $K_{i,b}$ corresponds to input bit $y_i = b$. The keys $U_{i,0}$ and $U_{i,1}$ represent the output bits of the encrypted circuit, i.e., if evaluation produces $U_{i,b}$, then the output bit $z_i$ is set to b.

The particular method in which C is encrypted ensures that for every gate in the circuit, given two keys representing its input bits, the key representing the resulting output bit can be readily computed, but no information is revealed about which cleartext bit it represents.

(II) Alice and Bob engage in a protocol for oblivious transfer, for example, as disclosed by S. Even, O. Goldreich and A. Lempel in "A randomized protocol for signing contract", Communications of the ACM 28 (1985), 637-647, or as disclosed by G. Brassard, C. Crépeau, and J.-M. Robert in "Information-theoretic reductions among disclosure problems", Proc. 27th IEEE Symposium on Foundations of Computer Science (FOCS), 1986. This is an interactive two-party protocol for a sender with input two messages $m_0$ and $m_1$ and a chooser with input a bit σ. At the end, the chooser receives $m_\sigma$ but does not learn anything about $m_{\sigma \oplus 1}$, and the sender has no information about σ.

More precisely, Alice acts as the sender and Bob obtains for every bit $y_i$ of his input the value $K'_i = K_{i,y_i}$ but learns nothing about $K_{i,y_i \oplus 1}$. At the same time, Alice learns nothing about $y_i$.

In addition, Alice computes the keys representing x as $L'_i = L_{i,x_i}$ for $i = 1, \ldots, n_x$ and sends $C, L'_1, \ldots, L'_{n_x}$, U to Bob.

(III) The second algorithm evaluate $(C, L'_1, \ldots, L'_{n_x}, K'_1, \ldots, K'_{n_y})$ takes as inputs the encrypted circuit, a representation of x, and a representation of y by the respective keys. It outputs the keys $U'_1, \ldots, U'_{n_z}$ from which Bob can recover z, and if Alice and Bob obey the protocol, then z=g(x, y).

Implementing the first and second algorithms construct and evaluate can be achieved by pseudo-random functions, as for example proposed by O. Goldreich, S. Goldwasser, and S. Micali in "How to construct random functions", Journal of the ACM 33 (1986), no. 4, 792-807, which are realized in practice by block ciphers. Block ciphers are very fast cryptographic primitives, even if implemented in software.

The following first describes how to use the encrypted circuit construction for realizing secure mobile code computation with a single or first entity. An extension to multiple entities is considered after that. The computation entity T publishes the public key of an encryption scheme. The corresponding encryption and decryption operations are denoted by $E_T(\bullet)$ and $D_T(\bullet)$, respectively. All entities can communicate over secure authenticated links, which could be realized by using standard public-key encryption and digital signatures.

The basic scheme is that O constructs an encrypted circuit C computing the two values ξ and z. The code originator CO sends C to the first entity H, but encrypts all keys in K for T and does not include the key pairs in U which correspond to ξ (denoted by $U_x$) so that the first entity H will not learn anything about ξ. Next, the first entity H selects from K the encrypted keys representing y and invokes the computation entity T to decrypt them in a single round of interaction. Then, the first entity H evaluates the circuit and obtains z; it also returns the keys in the circuit output representing ξ to O, who can determine ξ from this.

Let C be the binary circuit computing $(\xi, z) = (g(x,y), h(x,y))$ from the same inputs with $n_x + n_y$ input bits $x_1 i, \ldots, x_{n_x}$, $y_1, \ldots, y_{n_y}$ and $n_x | n_z$ output bits $\xi_1, \ldots, \xi_{n_x}, z_1, \ldots, z_{n_z}$, slightly modifying the notation from the previous section. The scheme proceeds in five steps 1) to 5), as described in the following.

1) O chooses a string id that uniquely identifies the computation, e.g., containing the name of O, a description of g and h, and a sequence counter. O invokes construct(C) and obtains (C, L, K, U) as above with U consisting of $n_x + n_z$ key pairs in total. $U_x$ denotes the pairs in U with indices $1, \ldots, n_x$ and $U_z$ denotes those with indices $n_x + 1, \ldots, n_x + n_z$.

For $i = 1, \ldots, n_y$ and $b \in \{0,1\}$, it computes $\overline{K}_{i,b} = E_T(id \| i \| K_{i,b})$.

Let $\underline{K}$ denote the list of pairs of all such $\overline{K}$. Then O lets $L'_i = L_{i,x_i}$ as above for $i = 1, \ldots, n_x$ and sends id, C, $L'_1, \ldots, L'_{n_x}, \underline{K}$, U to the first entity H.

2) The first entity H sets $\overline{K}'_i = \overline{K}_{i,y_i}$ for $i = 1, \ldots, n_y$ to be the encryptions representing its input y and sends them to the computation entity T along with id.

3) The computation entity T decrypts $\overline{K}'_i$ for $i = 1, \ldots, n_y$ and verifies that the ith decrypted string contains the identifier id and index i. If all checks are successful, the computation entity T returns the decrypted keys $K'_1, \ldots, K'_{n_y}$ to the first entity H.

4) The first entity H invokes the second algorithm evaluate $(C, L'_1, \ldots, L'_{n_x}, K'_1, \ldots, K'_{n_y})$ and obtains $U'_1, \ldots, U'_{n_x + n_z}$. Then, the first entity H determines $z = (z_1, \ldots, z_{n_z})$ such that $U_{n_x + i, z_i} = U'_{n_x + i}$ for $i = 1, \ldots, n_z$ and forwards the remaining values $U'_1, \ldots, U'_{n_x}$ to the code originator CO.

5) The code originator CO determines its output $\xi = (\xi_1, \ldots, \xi_{n_x})$ such that $U_{i, \xi_i} = U'_i$ for $i = 1, \ldots, n_x$.

For increased security, the computation entity T should use a public-key cryptosystem that is secure against adaptive chosen-ciphertext attacks, which means nonmalleable, as described by D. Dolev, C. Dwork, and M. Naor in "Non-malleable cryptography", SIAM Journal on Computing 30 (2000), no. 2, 391-437. The code originator CO and the first entity H should also commit to their inputs. In a practical system, all of these can be realized in the so-called "random oracle model" as described, for example, by M. Bellare and P. Rogaway in "Random oracles are practical: A paradigm for designing efficient protocols", Proc. 1st ACM Conference on Computer and Communications Security, 1993. using a secure hash function. In this case, the public-key encryption scheme and the pseudo-random functions for circuit encryption can be implemented with discrete logarithms based on the hardness of the Diffie-Hellman problem, as described by M. Naor and O. Reingold in "Number-theoretic constructions of efficient pseudo-random functions", Proc. 38th IEEE Symposium on Foundations of Computer Science (FOCS), 1997.

In the following, an extension of the above-described method is disclosed in order to achieve a general mobile computing scheme with multiple entities $H_1, \ldots, H_l$, as indicated in FIG. 1. The generalization is the natural one in which each entity executes steps 2) to 4) of the basic scheme above and sends the agent to the next entity afterwards.

Thereby, the code originator CO prepares one encrypted circuit C for each entity $H_1, \ldots, H_l$ and incorporates the encrypted state $x_{j-1}$ from $C^{(j-1)}$ into $C^{(j)}$ for j>1. This is achieved by using the output keys $U'_1{}^{(j-1)}, \ldots, U'_{n_x}{}^{(j-1)}$ from $C^{(j-1)}$ for decrypting a hidden representation of the inputs to $C^{(j)}$.

In a symmetric cryptosystem with encryption and decryption operations under key k denoted by $E_k(\bullet)$ and $D_k(\bullet)$, respectively, the cryptosystem includes sufficient redundancy such that given a potential key U and a ciphertext c one can determine with high probability whether c results from an encryption under U. The modifications to the scheme are as follows.

1a) The code originator CO obtains $C^{(j)}, L^{(j)}, K^{(j)}, U^{(j)}$, and $\underline{K}^{(j)}$, for j=1, ..., l in the same way as for C above. However, the code originator CO selects the values $L'_i = L'_{i,x_i}{}^{(1)}$ only for $C^{(1)}$. The identifier in the jth stage is set to id||j. The code originator CO also prepares two encryptions $$E_{U_{i,0}{}^{(j-1)}}(L_{i,0}{}^{(j)}) \text{ and } E_{U_{i,1}{}^{(j-1)}}(L_{i,1}{}^{(j)})$$

for each j>1 and i=1, ..., $n_x$, and randomly permutes them before assigning them to $V_{i,0}{}^{(j)}$ and $V_{i,1}{}^{(j)}$; call the list of such pairs $V^{(j)}$.

Then, the code originator CO sends $$id, L'_1, \ldots, L'_{n_x}, C^{(1)}, \underline{K}^{(1)}, U_z{}^{(1)} \text{ and } C^{(j)}, \underline{K}^{(j)}, U_z{}^{(j)}, V^{(j)}$$
$$\text{for } j=2, \ldots, l$$

to the first entity $H_1$ within a single message.

2a) For j>1, when $H_j$ runs step 2 of the basic scheme, is receives $V^{(j)}$ and $U'_1{}^{(j-1)}, \ldots, U'_{n_x}{}^{(j-1)}$ from $H_{j-1}$, which has before evaluated $C^{(j-1)}$.

Each entity interprets each $U'_i{}^{(j-1)}$ as a symmetric key to E, determines which one of the ciphertexts $V_{i,0}{}^{(j)}$ and $V_{i,1}{}^{(j)}$ it decrypts, and then decrypts the one that matches. This yields $K_i{}^{(j)}$, an oblivious representation of the ith bit in the current state $x_j$ of the agent. Those keys are then used to evaluate $C^{(j)}$.

3a) When $H_j$ has obtained its output from evaluating $C^{(j)}$, it forwards all data that it has received from $H_{j-1}$, together with $U'_1{}^{(j)}, \ldots, U'_{n_x}{}^{(j)}$, to $H_{j+1}$. At the end of the circle, $H_1$ returns $U'_1{}^{(l)}$ to the code originator CO.

The Computation Entity T Generates the Code

In a variation where the roles of O and T are switched, the computation entity T generates the encrypted circuit. Because it is trusted to follow the protocol one does not have to add a costly zero-knowledge proof for correctness of the whole circuit. Therefore, the operations of the other entities and the corresponding proofs ensuring robustness become much simpler. The computation entity T has to know g and h for constructing the circuit, but it may obtain a description of C from O in a first protocol message.

A three-party oblivious transfer protocol is used, as introduced by M. Naor, B. Pinkas, and R. Sumner in "Privacy preserving auctions and mechanism design", Proc. 1st ACM Conference on Electronic Commerce, 1999, in which the role of the chooser is separated among the chooser and a third party, called the receiver. Compared to the standard notion of oblivious transfer, the receiver gets the output message $m_o$ specified by the chooser, who itself learns nothing. This so-called "proxy" oblivious transfer can be realized using three message flows: from chooser to receiver and from receiver to sender and back.

The protocol uses also a one-round implementation of standard oblivious transfer between two parties, which can be realized using the method of C. Cachin, J. Camenisch, J. Kilian, and J. Müller, published in their article "One-round secure computation and secure autonomous mobile agents", at Proc. 27th International Colloquium on Automata, Languages and Programming (ICALP) (U. Montanari, J. P. Rolim, and E. Welzl, eds.), Lecture Notes in Computer Science, vol. 1853, Springer, July 2000, pp. 512-523.

As in the basic scheme the component of a encrypted circuit construction is applied. The protocol is described for the basic case of mobile code with a single entity H. Suppose O employs a public-key encryption scheme with encryption and decryption operations denoted by $E_O(\bullet)$ and $D_O(\bullet)$, respectively. O starts the computation as the chooser in $n_x$ parallel three-party oblivious transfers, one for each bit of x. It sends these hidden choices to H, who acts as the receiver in the three-party oblivious transfers, together with C and $E_O(\bullet)$. H forwards the appropriate data to T, who acts as the sender; it will send the key pairs L in the three-party oblivious transfer. Furthermore, H also prepares its input to $n_y$ parallel one-round oblivious transfers (playing the role of the chooser), one for each bit of y. It sends these to T, together with the descriptions of C and $E_O(\bullet)$; T will send the key pairs K in the one-round oblivious transfers.

T invokes construct(C) to obtain C and the key pairs L, K, and U. It replies to H with $E_O(U_x)$, C, U, and the final flows in all oblivious transfer protocols.

From this, H can determine the keys $L'_1, \ldots, L'_{n_x}$ representing x and the keys $K'_1, \ldots, L'_{n_y}$ representing y. It runs evaluate$(C, L'_1, \ldots, L'_{n_x}, K'_1, \ldots, K'_{n_y})$ to obtain $U'_1, \ldots, U'_{n_x+n_z}$ as above. Then it determines its output z from $U'_{n_z+1}, \ldots, U'_{n_x+n_z}$ and from $U_z$, and it forwards $U'_1, \ldots, U'_{n_x}$ together with $E_O(U_x)$ to O. This enables O to obtain its output $\xi$.

The following shows an extension of the protocol from a single host or first entity $H_1$ to l hosts $H_1, \ldots, H_l$. The protocol starts as before for the first host. However, the steps for $H_2, \ldots, H_l$ are slightly different: three-party oblivious transfer and encryption under $E_O$ are not used. Instead, T encrypts the keys $L^{(j)}$ in the input of $C^{(j)}$ and representing the state $x_{j-1}$ of the agent under the output keys in $U^{(j-1)}$ from $C^{(j-1)}$ as before $V^{(j)}$. The keys $U^{(j-1)}$ can be stored by T between step j−1 and step j or they can be sent along with the protocol flow and are transmitted to T via $H_{j-1}$ and $H_j$, whereby they are encrypted by $E_T(\bullet)$. In addition, the last host obtains $U_x$ encrypted with $E_O(\bullet)$ from T and forwards this to O as above.

The communication pattern is the same as in the basic scheme: there is one message from O to $H_1$, one from each $H_{j-1}$ to $H_j$ and one from $H_l$ to O, plus one communication flow between each host and the computation entity T Robustness can be added by using non-malleable public-key encryption schemes and non-interactive zero-knowledge proofs. However, the result will be much more practical because zero-knowledge proofs are not needed for the potentially large encrypted circuit. Moreover, the encrypted circuit construction can be implemented by a block cipher instead of public-key operations.

It is noted that any disclosed embodiment may be combined with one or several of the other embodiments shown and/or described. This is also possible for one or more features of the embodiments. The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

We claim:

1. A method for processing an originator request of a customer, the originator request being sendable to at least one first entity the method comprising:
    a) sending from said customer said originator request to said at least one first entity;
    b) connecting said at least one first entity to a computation entity;
    c) said at least one first entity adding, on receipt of the originator request, information concerning said originator request thereby forming a first-modified request;
    d) sending at least part of said first-modified request to at least said computation entity;
    e) said computation entity having received at least part of said first-modified request deriving a computation-entity result from said at least part of said first-modified request;
    f) sending at least part of said computation-entity result to said at least one first entity;
    g) said at least one first entity having received at least part of said computation-entity result by deriving therefrom a first-entity result and forwarding it at least in part; and
    h) said customer having received at least part of said first-entity result by said customer deriving therefrom a customer result.

2. A method for processing an originator request of a customer, the method comprising:
    a) receiving from said customer said originator request and adding information concerning said originator request thereby forming a first-modified request;
    b) sending at least part of said first-modified request to at least a computation entity that derives a computation-entity result therefrom and returns it at least in part; and
    c) said first entity having received at least part of said computation-entity result by deriving therefrom a first-entity result and forwarding it at least in part, whereby said customer is able to derive a customer result from said at least part of said first-entity result.

3. A method for processing a first-modified request from at least one first entity comprising at least part of an originator request from a customer by a computation entity, the method comprising:
    a) receiving said first-modified request from said at least one first entity;
    b) deriving a computation-entity result from at least part of said first-modified request;
    c) sending at least part of said computation-entity result to said at least one first entity that derives therefrom a first-entity result and forwards it at least in part, whereby said customer is able to derive a customer result from said at least part of said first-entity result.

4. The method according to claim 1, further comprising the step of applying a cryptographic operation to the requests and to the results.

5. A system for processing an originator request, comprising:
    a customer connected to at least one first entity; and
    a computation entity connected to at least said first entity;
    wherein said customer sends said originator request to said at least one first entity that adds information concerning said originator request thereby forming a first-modified request and sends at least part of said first-modified request to at least said computation entity, said computation entity derives a computation-entity result from said at least part of said first-modified request, and sends at least part of said computation-entity result to said at least one first entity, said at least one first entity derives a first-entity result from said at least part of said computation-entity result and forwards it at least in part,
    said customer being able to derive a customer result from said at least part of said first-entity result.

6. The system according to claim 5, wherein the originator request comprises a function in encrypted form.

7. The system according to claim 6, wherein the function in encrypted form comprises an encrypted circuit construction.

8. The system according to claim 5, wherein the originator request is part of a mobile code.

9. The system according to claim 5, wherein the originator request, the first-modified request, the computation-entity result, and the first-entity result comprise an encrypted part.

10. The system according to claim 5, wherein the originator request comprises one or more pikes of information of: an offer, customer information, and purchase information.

11. The system according to claim 5, wherein the first entity comprises at least one of: a web server offering a service, and a customer information concerning acceptance of the originator request.

12. The system according to claim 5, wherein the customer result comprises first-entity information concerning acceptance of the originator request.

13. A program storage device readable by machine, tangibly embodying a program of instructions executable by the machine to perform method steps for processing of an originator request, the originator request being sendable to at least one first entity, said method steps comprising the steps of:
    a) sending from said customer said originator request to said at least one first entity;
    b) connecting said at least one first entity to a computation entity;
    c) said at least one first entity adding, on receipt of the originator request, information concerning said originator request thereby forming a first-modified request;
    d) sending at least part of said first-modified request to at least said computation entity;
    e) said computation entity having received at least part of said first-modified request deriving a computation-entity result from said at least part of said first-modified request;
    f) sending at least part of said computation-entity result to said at least one first entity;
    g) said at least one first entity having received at least part of said computation-entity result by deriving therefrom a first-entity result and forwarding it at least in part; and h) said customer having received at least part of said first-entity result by said customer deriving therefrom a customer result.

14. A program storage device readable by machine, tangibly embodying a program of instructions executable by the machine to perform method steps for processing of an originator request of a customer, said method steps comprising the steps of:
   a) receiving from said customer said originator request and adding information concerning said originator request thereby forming a first-modified request;
   b) sending at least part of said first-modified request to at least a computation entity that derives a computation-entity result therefrom and returns it at least in part; and
   c) said first entity having received at least part of ii said computation-entity result by deriving therefrom a first-entity result and forwarding it at least in part, whereby said customer is able to derive a customer result from said at least part of said first-entity result.

15. A program storage device readable by machine, tangibly embodying a program of instructions executable by the machine to perform method steps for processing a first-modified request from at least one first entity comprising at least part of an originator request from a customer by a computation entity, said method steps comprising the steps of:
   a) receiving said first-modified request from said at least one first entity;
   b) deriving a computation-entity result from at least part of said first-modified request; and
   c) sending at least part of said computation-entity result to said at least one first entity that derives therefrom a first-entity result and forwards it at least in part, whereby said customer is able to derive a customer result from said at least part of said first-entity result.

* * * * *